US012623306B2

(12) United States Patent
Konishi et al.

(10) Patent No.: US 12,623,306 B2
(45) Date of Patent: May 12, 2026

(54) MIG WELDING METHOD

(71) Applicant: JFE STEEL CORPORATION, Tokyo (JP)

(72) Inventors: Kyohei Konishi, Tokyo (JP); Chikaumi Sawanishi, Tokyo (JP); Hiroshi Matsuda, Tokyo (JP); Yoshiaki Murakami, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 1050 days.

(21) Appl. No.: 17/772,777

(22) PCT Filed: Oct. 29, 2020

(86) PCT No.: PCT/JP2020/040669
§ 371 (c)(1),
(2) Date: Apr. 28, 2022

(87) PCT Pub. No.: WO2021/085544
PCT Pub. Date: May 6, 2021

(65) Prior Publication Data
US 2022/0402078 A1      Dec. 22, 2022

(30) Foreign Application Priority Data

Oct. 31, 2019     (JP) ................................. 2019-198321

(51) Int. Cl.
*B23K 35/02*          (2006.01)
*B23K 9/173*          (2006.01)
(Continued)

(52) U.S. Cl.
CPC .......... *B23K 35/0261* (2013.01); *B23K 9/173* (2013.01); *B23K 35/3073* (2013.01);
(Continued)

(58) Field of Classification Search
CPC ................ B23K 35/0261; B23K 9/173; B23K 35/3073; C22C 38/02; C22C 38/44; C22C 38/50; C22C 38/58
(Continued)

(56) References Cited

U.S. PATENT DOCUMENTS 10,155,276 B2     12/2018   Kawamoto et al.
2007/0210048 A1    9/2007   Koshiishi et al.
(Continued)

FOREIGN PATENT DOCUMENTS

CN          101032778 A     9/2007
CN          102039475 A     5/2011
(Continued)

OTHER PUBLICATIONS

Dec. 23, 2023 Office Action issued in Chinese Patent Application No. 202080074949.X.
(Continued)

*Primary Examiner* — Elizabeth M Kerr
*Assistant Examiner* — Simpson A Chen
(74) *Attorney, Agent, or Firm* — Oliff PLC

(57)          ABSTRACT

A MIG welding method for carbon steels using an Ar shielding gas. The method includes short-circuiting a welding wire and a base material. The average short-circuiting frequency in welding is 20 Hz to 300 Hz and the maximum short-circuiting period is 1.5 s or less.

4 Claims, 3 Drawing Sheets

(51) Int. Cl.

| | | |
|---|---|---|
| *B23K 35/30* | (2006.01) | |
| *C22C 38/02* | (2006.01) | |
| *C22C 38/44* | (2006.01) | |
| *C22C 38/50* | (2006.01) | |
| *C22C 38/58* | (2006.01) | |

(52) U.S. Cl.
CPC .............. *C22C 38/02* (2013.01); *C22C 38/44* (2013.01); *C22C 38/50* (2013.01); *C22C 38/58* (2013.01)

(58) Field of Classification Search
USPC ......................................................... 219/129
See application file for complete search history.

(56) References Cited

U.S. PATENT DOCUMENTS

| | | | |
|---|---|---|---|
| 2010/0181296 A1* | 7/2010 | Ueda ...................... | B23K 9/092 219/130.51 |
| 2011/0174784 A1 | 7/2011 | Kamei | |
| 2013/0161303 A1* | 6/2013 | Kasai ...................... | B23K 9/23 219/137 WM |

FOREIGN PATENT DOCUMENTS

| | | |
|---|---|---|
| CN | 103182611 A | 7/2013 |
| CN | 104159700 A | 11/2014 |
| EP | 2 610 361 A1 | 7/2013 |
| EP | 2 823 931 A1 | 1/2015 |
| JP | S53-034653 A | 3/1978 |
| JP | S58-138568 A | 8/1983 |
| JP | H11-285827 A | 10/1999 |
| JP | 2001-071175 A | 3/2001 |
| JP | 2002-205170 A | 7/2002 |
| JP | 2008-49376 A | 3/2008 |
| JP | 2011125895 A * | 6/2011 |
| JP | 5205115 B2 | 6/2013 |
| JP | 2015-30017 A | 2/2015 |
| JP | 2016-34658 A | 3/2016 |
| JP | 2016034658 A * | 3/2016 |
| JP | 2018-111114 A | 7/2018 |
| JP | 6373549 B2 | 8/2018 |
| JP | 2018-187651 A | 11/2018 |
| WO | 2010/038429 A1 | 4/2010 |
| WO | 2011/037272 A1 | 3/2011 |

OTHER PUBLICATIONS

Danfeng et al. "Research and Experiment on Double Pulsed MIG Aluminum Welding Process Parameters Design", Electric Welding Maching, vol. 40, No. 9. Sep. 20, 2010, pp. 17-21.

Oct. 16, 2023 Office Action issued in Korean Patent Application No. 10-2022-7013496.

Dec. 28, 2020 International Search Report issued in International Application No. PCT/JP2020/040669.

Jan. 11, 2022 Office Action issued in Japanese Patent Application No. 2021-509933.

Dec. 5, 2022 Search Report issued in European Patent Application No. 20882963.0.

Filho, D.F., et al., "The influence of gas shielding composition and contact tip to work distance in short circuit metal transfer of ferritic stainless steel," Welding International, vol. 24, No. 3, pp. 206-213 Mar. 2010.

Kah, P., "Welding of sheet metal using modified short arc MIG/ MAG welding process," Master's Thesis, Lappeenranta University of Technology, Apr. 24, 2007.

* cited by examiner (a)

(b)

(a)

(b)

MIG WELDING METHOD

TECHNICAL FIELD

This application relates to a MIG welding method in which carbon steels are welded together by the heat of an arc using an Ar gas as a shielding gas. Herein, the composition of the Ar gas is such that the volume fraction of Ar is more than 99.0%. A shielding gas made of the Ar gas is also referred to as an Ar shielding gas.

BACKGROUND

In MAG welding intended for carbon steels, $O_2$ or $CO_2$ contained in a shielding gas is decomposed by the heat of an arc as shown by Formula (2) or (3), respectively, and produced oxygen dissolves in molten metal. Oxygen dissolved as described above forms pores when a weld metal solidifies or causes an oxidation reaction with iron to deteriorate the mechanical performance of the weld metal. Therefore, in general, base material steel sheets and welding wires (hereinafter also simply referred to as wires) contain a nonferrous element such as Si, Mn, or Ti in the form of a deoxidizer. This allows oxygen in the weld metal to be discharged in the form of slug made of $SiO_2$, MnO, $TiO_2$, and the like.

$$O_2 \rightarrow 2[O] \tag{2}$$

$$CO_2 \rightarrow CO+[O] \tag{3}$$

On the other hand, in MIG welding in which the Ar shielding gas is used, the dissolution of oxygen in a weld metal is extremely low and therefore the addition of an element intended for deoxidation only is not necessary. This facilitates the design of a welded joint and allows the reduction in production cost of a welding material to be expected. In addition, slug which is made of oxides is not produced and therefore an improvement effect is expected on failures in coating properties due to the agglomeration or adhesion of slug on a surface of the weld metal. Furthermore, the usage of $CO_2$, which is known as a greenhouse effect gas, can be significantly reduced, which is significantly advantageous for environmental protection.

However, in MIG welding intended for carbon steels, there is a problem in that welding is extremely unstable. Since MAG welding or MIG welding is generally reverse-polarity welding in which an electrode is an anode, a cathode spot originating from a location which has a low work function like an oxide and in which electron emission is likely to occur is formed on a surface of a base material. In an aluminium alloy having a strong oxide film on a surface of a base material, a cathode spot originating from an oxide film on a weld line is stably formed and therefore good welding is possible. However, in a carbon steel having a relatively thin oxide film or no oxide film and in MIG welding in which no oxide derived from $O_2$ or $CO_2$ is produced unlike MAG welding, a cathode spot is not stationary but moves rapidly on a surface of a base material in pursuit of a location with a low work function. Therefore, welding is unstable and a weld bead has a meandering or wavy shape.

For this problem, improving problems by techniques described in, for example, Patent Literatures 1 to 3 has been proposed. Patent Literature 1 describes a welding method in which a joint with improved fatigue properties as compared with conventional MAG welding is obtained by reducing the proportion of $CO_2$ in a shielding gas to a limit at which the wandering of an arc does not occur.

Patent Literature 2 describes a welding method in which a good joint with no bead meanders is obtained in such a manner that an arc in MIG welding is stabilized by combining TIG welding with MIG welding.

Patent Literature 3 describes a welding method in which a flux-cored wire is used and is melted in two stages in such a manner that a steel hull is melted early and flux is melted late, so that a cross section of the wire is prevented from being uniformly melted and regular metal transfer is achieved in MIG welding.

CITATION LIST

Patent Literature

PTL 1: Japanese Patent No. 6373549
PTL 2: Japanese Unexamined Patent Application Publication No. 53-034653
PTL 3: Japanese Patent No. 5205115

SUMMARY

Technical Problem

However, in the welding method disclosed in Patent Literature 1, a slight amount of slug is produced and the deterioration of joint characteristics that results from the slug is inevitable because an acidic gas or gases are contained in the shielding gas, that is, 3% or more $CO_2$, 1% or more $O_2$, or 3% or more $CO_2$ and $O_2$ are contained on a volume basis. Furthermore, it is concerned that the increase in amount of an added alloy element in association with the hyper-increase in tensile strength of steel sheets and wires facilitates the increase in formation of slug.

In the welding method disclosed in Patent Literature 2, a welding equipment, particularly a welding torch is complicated and is large-sized and the number of control parameters such as welding conditions is large because TIG welding and MIG welding are performed at the same time. In addition, it is difficult to apply this welding method to a joint with a three-dimensional shape. Therefore, this welding method is of little practical use.

In the welding method disclosed in Patent Literature 3, an iron powder which has oxygen adsorbed on the surface thereof or which has been oxidized is contained in flux for the purpose of stabilizing a cathode spot. However, when the supply of oxygen is too high, it is conceivable that the oxygen content of a weld metal increases even if a shielding gas is an Ar gas. In addition, the composition of a wire needs to be adjusted. Therefore, it is hard to say that the welding method disclosed in Patent Literature 3 can be applied to all various steel sheets.

The disclosed embodiments have been made in view of the above problems. It is an object of the disclosed embodiments to provide a MIG welding method in which no special device is used, which has high robustness, in which the contamination of a weld metal with oxygen can be prevented, in which the formation of slug can be suppressed, and in which a welded joint with a good bead shape can be obtained.

Solution to Problem

From the observation of arc behavior in a welding experiment, the inventors have concluded that the main cause of a meandering or waving phenomenon of weld beads that is problematic for MIG welding intended for carbon steels is unstable metal transfer.

Specifically, under conditions including a welding current of 300 A or less, a mode in which a wire is melted and is continuously transported from a narrow liquid column to a molten pool and a mode in which a large droplet is formed at the tip of a wire and is transported to a molten pool by falling or short circuiting are present together in metal transfer in MIG welding. It is conceivable that regularly separating droplets from the tip of a wire is effective in suppressing this unstable metal transfer. However, when a shielding gas is an Ar gas, the electromagnetic pinch force acting on a wire is small and the separation of a droplet is difficult. Therefore, in the disclosed embodiments, metal transfer is stabilized by short-circuiting the tip of a wire.

The disclosed embodiments are based on the above finding and are as summarized below.

[1] A MIG welding method for carbon steels using an Ar shielding gas includes short-circuiting a welding wire and a base material. The average short-circuiting frequency in welding is 20 Hz to 300 Hz and the maximum short-circuiting period is 1.5 s or less.

[2] In the MIG welding method specified in [1], the welding current in the MIG welding method is a pulse current and the value X calculated by the following formula (1) satisfies $50 \leq X \leq 250$:

$$X = I_p t_p / L + (I_p + I_b)(t_{up} + t_{down})/(2L) \qquad (1)$$

where in Formula (1), $I_p$ is the peak current (A), $I_b$ is the base current (A), $t_p$ is the peak term (ms), $t_{up}$ is the rise term (ms), $t_{down}$ is the fall term (ms), and L is the distance (mm) between a contact tip and the base material.

[3] In the MIG welding method specified in [1] or [2], the welding wire is a solid wire.

[4] In the MIG welding method specified in [3], the solid wire has a wire composition containing C: 0.020% by mass to 0.150% by mass, Si: 0.20% by mass to 1.00% by mass, Mn: 0.50% by mass to 2.50% by mass, P: 0.020% by mass or less, and S: 0.03% by mass or less, the remainder being Fe and incidental impurities.

[5] In the MIG welding method specified in [4], one or more of Ni: 0.02% by mass to 3.50% by mass, Cr: 0.01% by mass to 1.50% by mass, Ti: 0.15% by mass or less, and Mo: 0.8% by mass or less are further contained in addition to the wire composition.

Advantageous Effects

According to the disclosed embodiments, a welded joint with a good bead shape can be stably obtained. In addition, the contamination of a weld metal with oxygen and the formation of slug can be suppressed in such a manner that robustness equivalent to conventional one is ensured because a welding equipment used in conventional MAG welding or MIG welding is used without changing the welding equipment to special specifications. There is an excellent effect that MIG welding in which a welded joint with excellent corrosion resistance and fatigue properties can be stably obtained can be achieved.

DETAILED DESCRIPTION

Figure 1:
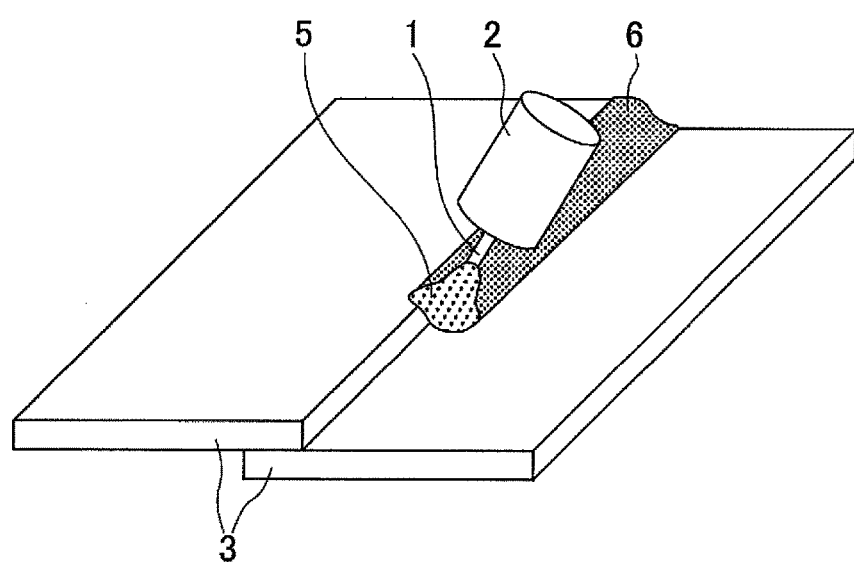
FIG. 1 is a schematic view showing an example of an embodiment.

The disclosed embodiments are described below in detail with reference to drawings. FIG. 1 is a schematic view showing an example of an embodiment. In this example, the fillet welding of a lap joint is shown as a representative. In the disclosed embodiments, the shape of a welded joint and the welding position are not limited.

In the disclosed embodiments, as shown in, for example, FIG. 1, a welding wire 1 continuously fed to base materials (specifically, a weld line composed of a stepped fillet section formed by stacking two of the base materials 3, which are, for example, steel sheets) from a welding torch 2 through a central section of the welding torch 2 is used as an anode, the base materials 3 are used as a cathode, and a welding voltage is applied from a welding power supply (not shown). A portion of an Ar shielding gas (not shown) supplied from inside the welding torch 2 is ionized or is converted into plasma, whereby an arc 5 is formed between the welding wire 1 and the base materials 3. A portion of the Ar shielding gas that flows from the welding torch 2 to the base materials 3 without being ionized has a role in shielding the arc 5 and a molten pool (not shown in FIG. 1) formed by the melting of the base materials 3 from outside air. A tip section of the welding wire 1 is melted by the heat of the arc 5 to form a droplet. The droplet is transported to the molten pool by electromagnetic force, gravity, or the like. This phenomenon occurs continuously in association with the movement of the welding torch 2 or the base materials 3, whereby the molten pool is solidified in the rear of the weld line and a weld bead 6 is formed. This allows the bonding of at least two steel sheets to be achieved.

On the other hand, when carbon steels are aimed, conventional MIG welding has a problem that welding is extremely unstable. MAG welding or MIG welding is reverse-polarity welding in which an electrode (wire) is an anode and therefore a cathode spot originating from a location which has a low work function like an oxide and in which electron emission is likely to occur is formed on a surface of a base material. In an aluminium alloy having a strong oxide film on a surface of a base material, a cathode spot originating from an oxide film on a weld line is stably formed and therefore good welding is possible. However, in a carbon steel having a relatively thin oxide film or no oxide film and in MIG welding in which no oxide derived from $O_2$ or $CO_2$ is produced unlike MAG welding, a cathode spot is not stationary but moves rapidly on a surface of a base material in pursuit of a location with a low work function. Therefore, welding is unstable and a weld bead has a meandering or wavy shape.

For this phenomenon, the inventors have observed arc behavior in a welding experiment and have concluded that the main cause of a meandering or wavy shape of weld beads that is problematic for MIG welding intended for carbon steels is unstable metal transfer.

Figure 2:
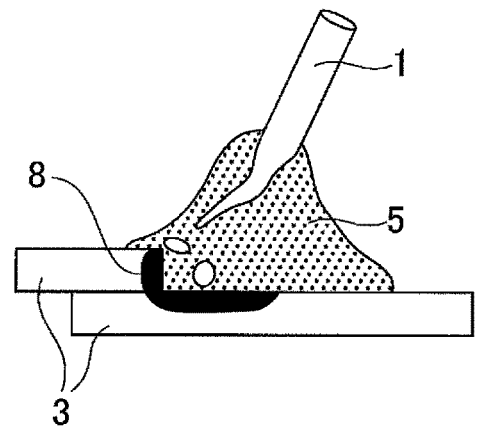
FIGS. 2(a) and 2(b) are schematic views showing the mode of metal transfer in conventional MIG welding.
Figure 2:
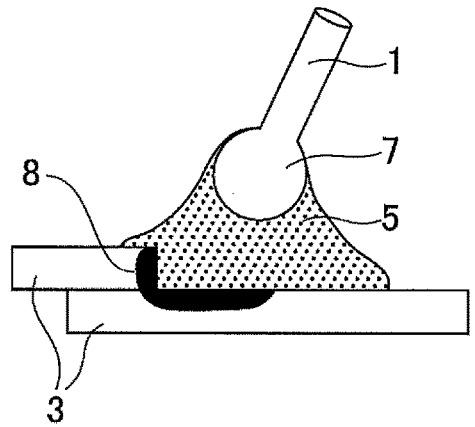

FIGS. 2(a) and 2(b) present a schematic view showing the mode of metal transfer in conventional MIG welding. Specifically, under conditions including a welding current of 300 A or less, a mode in which the wire 1 is melted and is continuously transported from a narrow liquid column to a molten pool 8 as shown in FIG. 2(*a*) and a mode in which a large droplet 7 is formed at the tip of the wire 1 and is transported to the molten pool 8 by falling or short circuiting as shown in FIG. 2(*b*) are present together in metal transfer in conventional MIG welding. It is conceivable that regularly separating the droplet 7 from the tip of the wire 1 is effective in suppressing this unstable metal transfer. However, in the case of an Ar shielding gas, the electromagnetic pinch force acting on the wire 1 is small and the separation of the droplet 7 is difficult.

Figure 3:
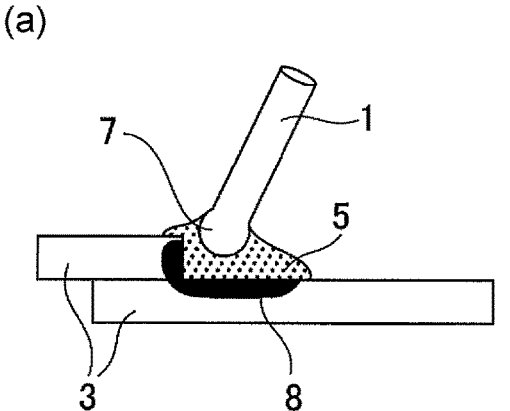
FIGS. 3(a) and 3(b) are schematic views showing the mode of metal transfer in the disclosed embodiments.
Figure 3:
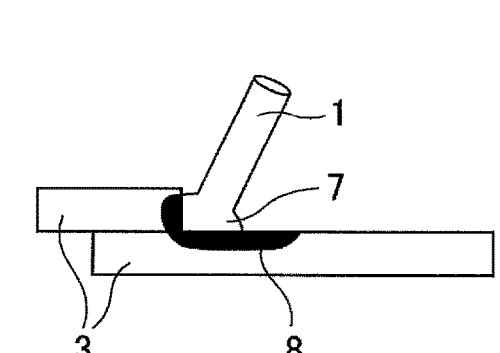

Therefore, in the disclosed embodiments, it has been found that the completion of bonding by so-called short-circuiting transfer in which a non-short circuit condition in FIG. 3(*a*) and a short circuit condition in FIG. 3(*b*) are regularly repeated between the tip of the wire 1 and the base materials 3 and in which the droplet 7 is transferred to the base materials 3 in the short circuit condition is effective as a means for stabilizing metal transfer.

Since welding is destabilized when the volume of the droplet 7 at the tip of the welding wire 1 is too small or too large, the volume of the droplet 7 at the tip of the welding wire 1, the droplet 7 being transported to the molten pool 8 by short circuiting once, is preferably substantially equal to the volume of a sphere with the same diameter as the diameter of the wire. Therefore, in the disclosed embodiments, the average frequency (average short-circuiting frequency) F (Hz) of short-circuiting transfer is 20 Hz to 300 Hz. In addition, the maximum short-circuiting period $t_{cyc}$ (s (seconds)) is 1.5 s or less because in order to obtain a good bead shape, short circuiting preferably occurs periodically.

Herein, the maximum short-circuiting period $t_{cyc}$ is not necessarily constant every time and means the maximum one of short-circuiting periods in one welding pass. Thus, the fact that the maximum short-circuiting period $t_{cyc}$ is 1.5 s or less is synonymous with the fact that each short-circuiting period does not exceed 1.5 s. This allows regular metal transfer to be achieved in MIG welding in which an Ar shielding gas is used, thereby obtaining a stable weld bead.

When the average short-circuiting frequency F is such that F<20 Hz, the presence of spray transfer is significant and metal transfer is irregular. When F>300 Hz, a molten pool is disturbed by the restriking of an arc in association with short circuiting. Therefore, in every case, it is difficult to eliminate the meandering or waving of a weld bead. Incidentally, F is preferably 40 Hz to 280 Hz.

Even if the average short-circuiting frequency F satisfies the condition 20≤F (Hz)≤300, when the maximum short-circuiting period is such that $t_{cyc}$>1.5 s, the wandering of an arc occurs and no good weld bead is obtained. It is preferable that $t_{cyc}$<1.0 s. It is more preferable that $t_{cyc}$ is 0.2 s or less.

Herein, the average frequency (average short-circuiting frequency) F (Hz) of short-circuiting transfer can be measured in such a manner that the change in arc voltage while welding is in progress is monitored with, for example, an oscilloscope; the number of times the arc voltage reaches zero is counted; and the number of counts per second is determined by dividing the number of counts by the monitoring time. When the monitoring time is too short, variations in the number of the counts is large. Therefore, the monitoring time is preferably 10 s or more. Adjusting welding conditions such that the measured value of the average short-circuiting frequency F should be a target value enables 20≤F (Hz)≤300 to be achieved.

Examples of the preferred range of welding conditions include a welding current of 150 A to 300 A, an arc voltage of 20 V to 35 V, a contact tip-to-base material distance (hereinafter also referred to as CTWD) of 5 mm to 30 mm, and an Ar shielding gas flow rate of 15 L/min to 25 L/min. The welding current and the arc voltage are average values in each welding pass.

Figure 4:
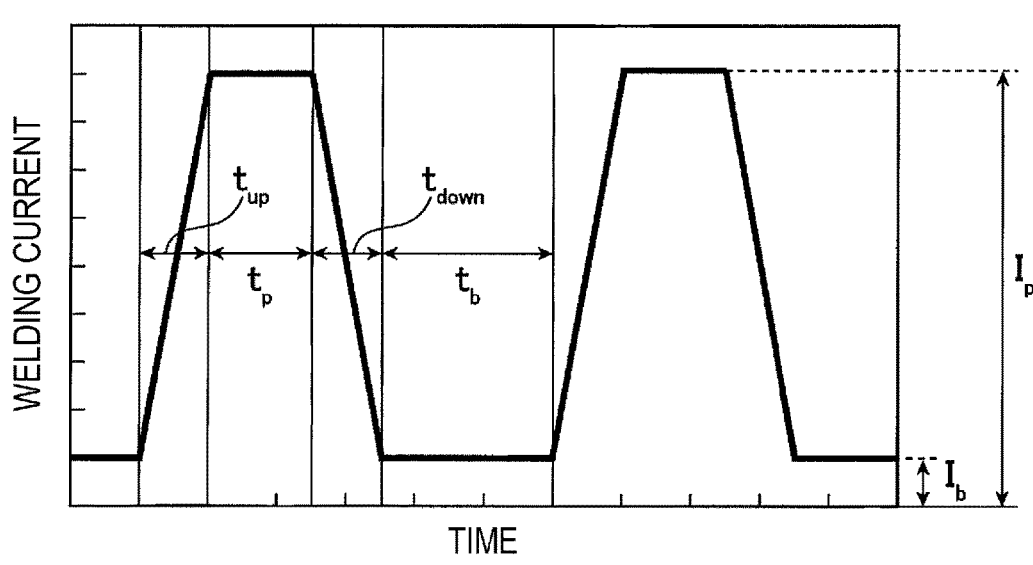
FIG. 4 is a schematic view showing a pulse current waveform in MIG welding according to the disclosed embodiments.

Furthermore, a technique for adjusting each of the average short-circuiting frequency and the maximum short-circuiting period within the above range is not particularly limited. For example, current waveform control is applied using a pulse current as shown in FIG. 4 and supposing that a peak current is $I_p$ (A), a base current is $I_b$ (A), a peak term is $t_p$ (ms), a rise term is $t_{up}$ (ms), a fall term is $t_{down}$ (ms), and CTWD is L (mm), the value of X (A·s/m) calculated by Formula (1) below satisfies 50≤X≤250, thereby enabling an effect of the disclosed embodiments to be effectively obtained.

$$X=I_p t_p/L+(I_p+I_b)(t_{up}+t_{down})/(2L) \tag{1}$$

When X is too small, less than 50 A·s/m, the wandering of an arc or the destabilization of metal transfer that is problematic for conventional MIG welding occurs in some cases. When X is too large, more than 250 A·s/m, a wire dips into a molten pool or a grown droplet splashes at the time of short circuiting, thereby causing the deterioration of a bead shape, spatter adhesion, or the like in some cases. The value of X (A·s/m) is more preferably such that 60≤X≤230.

In Formula (1), when L is too small, the wear of a torch is significant and welding is destabilized. When L is too large, the wandering of an arc occurs. Therefore, L is preferably 5 mm to 30 mm and more preferably 8 mm to 20 mm.

When $I_p$ is too small, sufficient heat input cannot be ensured and the deterioration of a bead shape occurs. When $I_p$ is too large, burn-through occurs or an increase in spatter is caused. Therefore, $I_p$ is preferably 250 A to 600 A. $I_p$ is more preferably 400 A or more and 500 A or less.

When $I_b$ is too small, an arc is destabilized. When $I_b$ is too large, burn-through occurs. Therefore, $I_p$ is preferably 30 A to 120 A. $I_p$ is more preferably 40 A or more and 100 A or less.

When $t_p$ is too short, sufficient heat input cannot be ensured. When $t_p$ is too long, burn-through occurs. Therefore, $t_p$ is preferably 0.1 ms to 5.0 ms. It is more preferable that $t_p$ is 1.0 ms or more and 4.5 ms or less.

When $t_{up}$ and $t_{down}$ are too short, the wandering of an arc occurs. When $t_{up}$ and $t_{down}$ are too long, the deterioration of a bead shape is caused. Therefore, $t_{up}$ and $t_{down}$ are preferably 0.1 ms to 3.0 ms. It is more preferable that $t_{up}$ and $t_{down}$ are 0.5 ms or more and 2.5 ms or less.

Supposing that a base term is $t_b$ (ms), when $t_b$ is too short, a droplet is too small. When $t_b$ is too long, a droplet is too large. Therefore, in either case, welding is destabilized. Thus, $t_b$ is preferably 0.1 ms to 10.0 ms. It is more preferable that $t_b$ is 1.0 ms or more and 8.0 ms or less.

In the disclosed embodiments, one short circuit need not be caused in every cycle of the pulse current and may be caused for one to several pulses. If one short circuit can be caused for one to several pulses, the pulse frequency of the pulse current is not particularly limited.

In the disclosed embodiments, an aim of introducing the pulse current is to promote the stable growth of a droplet with the wandering of an arc suppressed using a low current in the base term and to promote short circuiting in such a manner that the grown droplet is pushed down to a molten pool instead of separating the grown droplet from a wire by electromagnetic force or the shear force of an Ar shielding gas from the peak term to the fall term.

In a technique for stabilizing the above MIG welding according to the disclosed embodiments, the supply of oxygen or the addition of a special element is not necessary. Therefore, a solid wire which is more inexpensive than flux-cored wires is used as a welding wire, thereby enabling cost reduction.

In the disclosed embodiments, the wire composition of the solid wire used (the chemical composition of a wire) is not particularly limited. A wire composition containing, for example, C: 0.020% by mass to 0.150% by mass, Si: 0.20% by mass to 1.00% by mass, Mn: 0.50% by mass to 2.50% by mass, P: 0.020% by mass or less, and S: 0.03% by mass or less, the remainder being Fe and incidental impurities, is cited as a preferred wire composition. Such a wire composition can be applied to the MIG welding of steels in a wide range from mild steel to ultra-high tensile strength steel.

Herein, C is an element necessary to ensure the strength of a weld metal and has an effect of reducing the viscosity of molten metal to enhance the fluidity. However, when the content of C is less than 0.020% by mass, the strength of the weld metal cannot be ensured. On the other hand, when the C content is more than 0.150% by mass, the toughness of the weld metal decreases. Thus, the C content is preferably 0.020% by mass to 0.150% by mass.

Si is an element which has a deoxidizing action, which increases the hardenability of a weld metal by the addition of an appropriate amount, and which contributes to enhancing the toughness and strength of the weld metal. In MIG welding, the contamination of the weld metal with oxygen can be suppressed using an Ar shielding gas. The deoxidizing action of Si is not particularly necessary. When the content of Si is less than 0.20% by mass, a droplet or a molten pool swings in a welding operation and a large amount of spatter occurs. On the other hand, when the Si content is more than 1.00% by mass, the toughness of the weld metal decreases. Thus, the Si content is preferably 0.20% by mass to 1.00% by mass.

Mn, as well as Si, is an element which has a deoxidizing action and which enhances mechanical properties of a weld metal. However, when the content of Mn is less than 0.50% by mass, the amount of Mn remaining in the weld metal is short and therefore no sufficient strength or toughness is obtained. On the other hand, when the Mn content is more than 2.50% by mass, the toughness of the weld metal decreases. Thus, the Mn content is preferably 0.50% by mass to 2.50% by mass.

P is an element which is trapped in steel in a steelmaking process and a casting process in the form of an impurity and which reduces the hot cracking resistance of a weld metal. The content of P is preferably reduced as much as possible. In particular, when the P content is more than 0.020% by mass, the hot cracking resistance of the weld metal decreases significantly. Thus, the P content is preferably 0.020% by mass or less.

S is an element which is inevitably contained in a steel strand and which reduces the hot cracking resistance of a weld metal. The content of S is preferably reduced as much as possible. In particular, when the S content is more than 0.03% by mass, the hot cracking of the weld metal is likely to occur. Thus, the S content is preferably 0.03% by mass or less.

The incidental impurities are specifically N and Cu. N is an impurity which is inevitably contained at a stage of obtaining steel billet by steelmaking or at a stage of manufacturing a steel strand. N has a negative influence on the toughness of a weld metal and therefore the content thereof is preferably suppressed to 0.01% by mass or less. Cu is an impurity which is inevitably contained in a steel strand and is an element which reduces the toughness of a weld metal. In particular, when the content of Cu is more than 3.0% by mass, the toughness of the weld metal decreases significantly. Thus, the Cu content is preferably 3.0% by mass or less.

Furthermore, one or more of Ni, Cr, Ti, and Mo may be appropriately added in addition to the above composition.

Ni is an element which increases the strength of a weld metal and which enhances the weather resistance thereof. However, when the content of Ni is less than 0.02% by mass, such an effect is not obtained. On the other hand, when the Ni content is more than 3.50% by mass, the reduction in toughness of the weld metal is caused. Thus, when Ni is added, the Ni content is preferably 0.02% by mass to 3.50% by mass.

Cr, as well as Ni, is an element which increases the strength of a weld metal and which enhances the weather resistance thereof. However, when the content of Cr is less than 0.01% by mass, such an effect is not obtained. On the other hand, when the Cr content is more than 1.50% by mass, the reduction in toughness of the weld metal is caused. Thus, when Cr is added, the Cr content is preferably 0.01% by mass to 1.50% by mass.

Ti is an element which acts as a deoxidizer and which enhances the strength and toughness of a weld metal. In addition, Ti has an effect of stabilizing an arc to reduce the amount of spatter. However, when the content of Ti is more than 0.15% by mass, a droplet becomes coarse in a welding operation, large drops of spatter occur, and the toughness of the weld metal decreases significantly. Thus, when Ti is added, the Ti content is preferably 0.15% by mass or less.

Mo is an element which enhances the strength of a weld metal. When the content thereof is more than 0.8% by mass, the toughness of the weld metal decreases. Thus, when Mo is added, the content of Mo is preferably 0.8% by mass or less.

EXAMPLES

Examples of the disclosed embodiments are described below. In the examples, the fillet welding of a lap joint was performed under MIG welding conditions shown in Table 2 using 2.6 mm thick steel sheets having a steel sheet composition shown in Table 1 as sample steel sheets. Welding wires used were solid wires 1.2 mm in diameter having a wire composition shown in Table 3.

Results obtained by evaluating a bead shape after welding are shown in Table 2.

As shown in Table 2, the "symbol ⊙" is a case where "the value ($W_{min}/W_{max}$) obtained by dividing the minimum ($W_{min}$) of the width of a bead by the maximum ($W_{max}$) of the width of the bead is 0.7 or more" and "the flank angle ($\theta$) is 120° or more".

The "symbol ○" is a case where "the value ($W_{min}/W_{max}$) obtained by dividing the minimum of the width of a bead by the maximum of the width of the bead is 0.7 or more" and "the flank angle ($\theta$) is 100° to less than 120°" or a case where "the value ($W_{min}/W_{max}$) obtained by dividing the minimum of the width of a bead by the maximum of the width of the bead is 0.6 or more to less than 0.7" and "the flank angle ($\theta$) is 120° or more".

The "symbol Δ" is a case where "the value ($W_{min}/W_{max}$) obtained by dividing the minimum of the width of a bead by the maximum of the width of the bead is 0.6 or more to less than 0.7" and "the flank angle ($\theta$) is 100° or more to less than 120°".

The "symbol x" is a case that corresponds to at least one of a case where "the value ($W_{min}/W_{max}$) obtained by dividing the minimum of the width of a bead by the maximum of the width of the bead is less than 0.6" and a case where "the flank angle (θ) is less than 100°".

Figure 5:
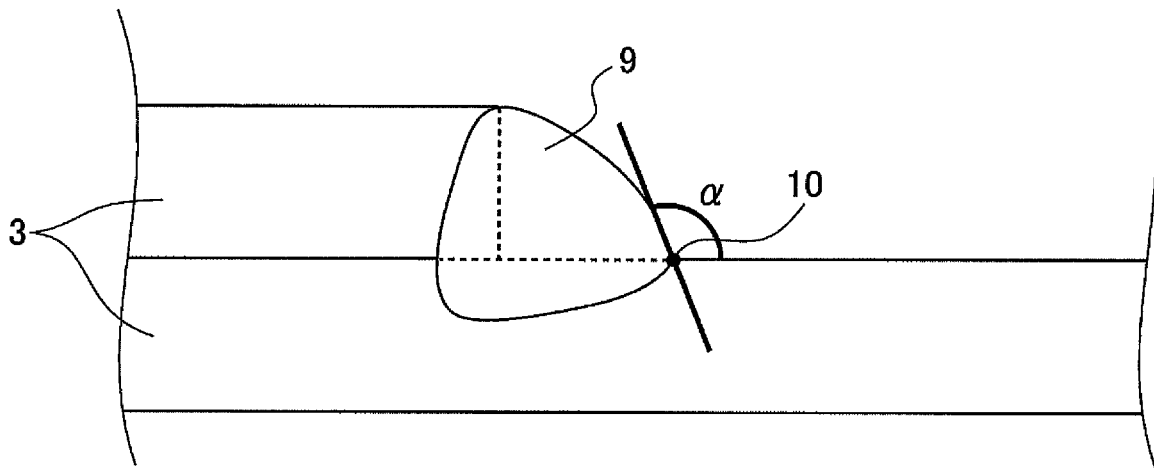
FIG. 5 is a schematic view illustrating the flank angle of a weld bead toe section in an example of the disclosed embodiments.

The minimum of the width of a bead and the maximum of the width of the bead are measured in such a manner that a surface of a region of a weld bead 6 that excludes bead start and end sections (each having a length of 15 mm) is photographed and an obtained photograph is analyzed. When the length of the weld bead 6 is less than 130 mm, a surface of the whole excluding the bead start and end sections is photographed. When the length of the weld bead 6 is 130 mm or more, a surface of any section (a length of 100 mm) excluding the bead start and end sections is photographed. The flank angle is determined by shape measurement. FIG. 5 shows a schematic view of a weld bead toe section and the vicinity thereof. The angle α)(° in FIG. 5 is the flank angle of the weld bead toe section.

The above "$W_{min}/W_{max}$" is an indicator showing the degree of meandering and waving.

As is clear from Table 2, Examples (Nos. 5 to 21) in which a symbol indicating evaluation was ⊙, ○, or Δ satisfied an average short-circuiting frequency F of 20 Hz or more to 300 Hz or less and a maximum short-circuiting period $t_{cyc}$ of 1.5 s or less. As a result, the formation of a weld bead was stable, the meandering or waving of a weld bead was slight, and a weld bead with a large flank angle (θ) and a smooth toe shape was obtained. In Examples in which a symbol was ○, the above effects were remarkable. In Examples in which a symbol was ⊙, the above effects were more remarkable.

On the other hand, Comparative Examples (Nos. 1 to 4 and 22) in which a symbol for evaluation shown in Table 2 was x were such that the average short-circuiting frequency F was less than 20 Hz or the maximum short-circuiting period $t_{cyc}$ was 1.5 s or more and the formation of a weld bead was unstable. As a result, at least one of a weld bead with significant meandering or waving and a convex bead with a small flank angle (θ) appeared.

From Examples (Nos. 5, 7 to 9, 11, 12, 15, and 20) in which a symbol was ⊙, it could be confirmed that a stable weld bead was obtained using a welding wire for either of mild steel (the wire symbol W1 in Table 3) and ultra-high tensile strength steel (the wire symbol W2 in Table 3).

TABLE 1

| | | | | | | | | | | | | (mass percent) |
| C | Si | Mn | P | S | N | Cu | Ni | Ti | B | Nb | Mo | Cr |
| --- | --- | --- | --- | --- | --- | --- | --- | --- | --- | --- | --- | --- |
| 0.060 | 0.70 | 1.80 | 0.006 | 0.001 | 0.0030 | 0.017 | 0.015 | 0.106 | 0.0020 | 0.002 | 0.014 | 0.568 |

(Remainder: Fe and incidental impurities)

TABLE 2

| No | F Hz | $t_{cyc}$ s | L mm | Wire | Welding current A | Arc voltage V | Welding speed cm/min | Pulse | $I_p$ A | $I_b$ A | $t_p$ ms | $t_{up}$ ms |
| --- | --- | --- | --- | --- | --- | --- | --- | --- | --- | --- | --- | --- |
| 1 | 8 | 0.53 | 15 | W2 | 160 | 24.6 | 70 | Not pulsed | — | — | — | — |
| 2 | 17 | 0.31 | 15 | W2 | 216 | 25.2 | 70 | Not pulsed | — | — | — | — |
| 3 | 19 | 0.48 | 15 | W2 | 182 | 24.9 | 70 | Not pulsed | — | — | — | — |
| 4 | 43 | 1.59 | 15 | W2 | 268 | 23.8 | 70 | Not pulsed | — | — | — | — |
| 5 | 47 | 0.06 | 10 | W2 | 237 | 27.1 | 70 | Pulsed | 450 | 50 | 1.5 | 1.0 |
| 6 | 54 | 0.39 | 15 | W2 | 234 | 23.9 | 70 | Not pulsed | — | — | — | — |
| 7 | 57 | 0.07 | 10 | W2 | 269 | 27 | 70 | Pulsed | 450 | 50 | 1.5 | 1.0 |
| 8 | 70 | 0.04 | 10 | W1 | 295 | 25.6 | 70 | Pulsed | 450 | 50 | 1.5 | 1.0 |
| 9 | 85 | 0.01 | 15 | W1 | 214 | 19.7 | 50 | Pulsed | 450 | 50 | 1.5 | 1.0 |
| 10 | 87 | 0.01 | 10 | W2 | 226 | 25.4 | 70 | Pulsed | 450 | 50 | 1.5 | 1.0 |
| 11 | 293 | 0.005 | 10 | W1 | 252 | 18.3 | 70 | Pulsed | 450 | 50 | 0.8 | 1.0 |
| 12 | 88 | 0.010 | 10 | W2 | 221 | 25.1 | 70 | Pulsed | 300 | 50 | 1.5 | 1.0 |
| 13 | 55 | 0.120 | 10 | W2 | 171 | 23.2 | 60 | Pulsed | 250 | 30 | 2.0 | 1.0 |
| 14 | 159 | 0.010 | 10 | W2 | 235 | 26.4 | 100 | Pulsed | 580 | 50 | 1.5 | 1.0 |
| 15 | 186 | 0.007 | 10 | W2 | 237 | 22.7 | 100 | Pulsed | 550 | 50 | 2.0 | 1.0 |
| 16 | 89 | 0.010 | 10 | W2 | 205 | 24.1 | 70 | Pulsed | 400 | 30 | 4.5 | 1.5 |
| 17 | 101 | 0.010 | 10 | W2 | 254 | 19.2 | 70 | Pulsed | 450 | 100 | 1.5 | 1.0 |
| 18 | 111 | 0.010 | 10 | W2 | 255 | 20.3 | 70 | Pulsed | 450 | 120 | 1.5 | 1.0 |
| 19 | 122 | 0.008 | 10 | W2 | 245 | 22.5 | 70 | Pulsed | 450 | 50 | 5.0 | 1.0 |
| 20 | 66 | 0.050 | 10 | W2 | 252 | 18.3 | 70 | Pulsed | 450 | 50 | 0.8 | 0.5 |
| 21 | 219 | 0.005 | 10 | W2 | 234 | 21.8 | 70 | Pulsed | 450 | 50 | 2.0 | 3.0 |
| 22 | 11 | 0.62 | 15 | W2 | 194 | 21.8 | 100 | Not pulsed | — | — | — | — |

| No | $t_{down}$ ms | $t_b$ ms | X *1 A · s/m | Wmin/Wmax | θ ° | Evaluation | Remarks |
| --- | --- | --- | --- | --- | --- | --- | --- |
| 1 | — | — | — | 0.48 | 135 | X | Comparative example |
| 2 | — | — | — | 0.57 | 125 | X | Comparative example |
| 3 | — | — | — | 0.53 | 125 | X | Comparative example |
| 4 | — | — | — | 0.44 | 143 | X | Comparative example |
| 5 | 1.0 | 1.9 | 118 | 0.76 | 134 | ⊙ | Example |
| 6 | — | — | — | 0.63 | 116 | Δ | Example |
| 7 | 1.0 | 1.1 | 118 | 0.72 | 125 | ⊙ | Example |
| 8 | 1.0 | 0.6 | 118 | 0.75 | 128 | ⊙ | Example |
| 9 | 1.0 | 3.2 | 78 | 0.81 | 121 | ⊙ | Example |

TABLE 2-continued

| | | | | | | | |
|---|---|---|---|---|---|---|---|
| 10 | 1.0 | 4.8 | 118 | 0.68 | 137 | ○ | Example |
| 11 | 1.0 | 1.8 | 61 | 0.70 | 125 | ⊙ | Example |
| 12 | 1.0 | 0.2 | 80 | 0.86 | 121 | ⊙ | Example |
| 13 | 1.0 | 0.7 | 78 | 0.82 | 102 | ○ | Example |
| 14 | 1.0 | 3.8 | 153 | 0.69 | 104 | Δ | Example |
| 15 | 1.0 | 4.0 | 113 | 0.71 | 122 | ⊙ | Example |
| 16 | 1.5 | 5.6 | 245 | 0.77 | 119 | ○ | Example |
| 17 | 1.0 | 2.8 | 123 | 0.73 | 115 | ○ | Example |
| 18 | 1.0 | 2.6 | 125 | 0.68 | 117 | Δ | Example |
| 19 | 1.0 | 5.3 | 275 | 0.68 | 110 | Δ | Example |
| 20 | 0.5 | 1.9 | 153 | 0.70 | 123 | ⊙ | Example |
| 21 | 3.0 | 2.9 | 169 | 0.82 | 102 | ○ | Example |
| 22 | — | — | — | 0.61 | 98 | X | Comparative example |

Polarity: direct-current reverse polarity

Shielding gas: 100% Ar, a gas flow rate of 15 L/min

Evaluation:

⊙ is a case where "the value ($W_{min}/W_{max}$) obtained by dividing the minimum of the width of a bead by the maximum of the width of the bead is 0.7 or more" and "the flank angle (θ) is 120° or more".

○ is a case where "the value ($W_{min}/W_{max}$) obtained by dividing the minimum of the width of a bead by the maximum of the width of the bead is 0.7 or more" and "the flank angle (θ) is 100° or more to less than 120°" or a case where "the value ($W_{min}/W_{max}$) obtained by dividing the minimum of the width of a bead by the maximum of the width of the bead is 0.6 or more to less than 0.7" and "the flank angle (θ) is 120° or more".

Δ is a case where "the value ($W_{min}/W_{max}$) obtained by dividing the minimum of the width of a bead by the maximum of the width of the bead is 0.6 or more to less than 0.7" and "the flank angle (θ) is 100° or more to less than 120°".

X is a case that corresponds to at least one of a case where "the value ($W_{min}/W_{max}$) obtained by dividing the minimum of the width of a bead by the maximum of the width of the bead is less than 0.6" and a case where "the flank angle (θ) is less than 100°".

[1] $X = I_p t_p/L + (I_p + I_b)(t_{up} + t_{down})/(2\,L) \ldots (1)$

TABLE 3

| Symbol | C | Si | Mn | P | S | Ni | Cr | Mo (mass percent) | Ti |
|---|---|---|---|---|---|---|---|---|---|
| W1 | 0.060 | 0.62 | 1.27 | 0.010 | 0.015 | — | — | — | — |
| W2 | 0.068 | 0.57 | 1.08 | 0.006 | 0.006 | 0.030 | 1.34 | 0.60 | <0.001 |

(Remainder: Fe and incidental impurities)

The invention claimed is:

1. A MIG welding method for carbon steels using an Ar shielding gas that includes a volume fraction of Ar of more than 99%, the method comprising:
   short-circuiting a welding wire and a base material, wherein:
      an average short-circuiting frequency in welding is in a range of 20 Hz to 300 Hz, and
      a maximum short-circuiting period is 1.5 s or less, and
      a welding current in the welding is a pulse current and a value X calculated by the following formula (1) satisfies 50≤X≤250:

$$X = I_p t_p/L + (I_p + I_b)(t_{up} + t_{down})/(2L) \qquad (1)$$

where, $I_p$ is a peak current (A), $I_b$ is a base current (A), $t_p$ is a peak term (ms), $t_{up}$ is a rise term (ms), $t_{down}$ is a fall term (ms), and L is a distance (mm) between a contact tip and the base material.

2. The MIG welding method according to claim 1, wherein the welding wire is a solid wire.

3. The MIG welding method according to claim 2, wherein the solid wire has a wire chemical composition comprising, by mass %:
   C: 0.020% to 0.150%;
   Si: 0.20% to 1.00%;
   Mn: 0.50% to 2.50%;
   P: 0.020% or less;
   S: 0.03% or less, and the remainder being Fe and incidental impurities.

4. The MIG welding method according to claim 3, wherein the wire chemical composition further comprises at least one selected from the group consisting of, by mass %: Ni: 0.02% to 3.50%, Cr: 0.01% to 1.50%, Ti: 0.15% or less, and Mo: 0.8% or less.

* * * * *